(12) United States Patent
Serdynski

(10) Patent No.: US 11,518,130 B2
(45) Date of Patent: Dec. 6, 2022

(54) LINK PRESS ASSEMBLY AND METHOD OF USE

(71) Applicant: WTC Machinery, LLC, Ixonia, WI (US)

(72) Inventor: David P. Serdynski, Waukesha, WI (US)

(73) Assignee: WTC Machinery, LLC, Ixonia, WI (US)

( * ) Notice: Subject to any disclaimer, the term of this patent is extended or adjusted under 35 U.S.C. 154(b) by 277 days.

(21) Appl. No.: 16/949,488

(22) Filed: Oct. 30, 2020

(65) Prior Publication Data

US 2021/0154960 A1   May 27, 2021

Related U.S. Application Data

(60) Provisional application No. 62/940,585, filed on Nov. 26, 2019.

(51) Int. Cl.
   *B21L 9/06*   (2006.01)
   *B21L 21/00*  (2006.01)
   (Continued)

(52) U.S. Cl.
   CPC .............. *B30B 15/041* (2013.01); *B21L 9/065* (2013.01); *B21L 21/00* (2013.01); *B30B 15/062* (2013.01); *B62D 55/32* (2013.01)

(58) Field of Classification Search
   CPC ......... B26D 55/32; B21L 9/065; B21L 21/00; B30B 15/041; B30B 15/062
   (Continued)

(56) References Cited

U.S. PATENT DOCUMENTS 2,387,551 A * 10/1945 Abramson ............. B62D 55/32
                                                         59/7
4,027,471 A *  6/1977 Lipp ...................... B62D 55/32
                                                         59/7
(Continued)

OTHER PUBLICATIONS

D65PX-18 Plus UC Repair Field Manual using a Komatsu PN 791-532-2201, first known to Applicant by at least Jan. 10, 2019, 8 pages.

(Continued)

*Primary Examiner* — Jessica Cahill
*Assistant Examiner* — Jared O Brown
(74) *Attorney, Agent, or Firm* — James A Joyce; Godfrey & Kahn, S.C.

(57) ABSTRACT

A link press assembly for use with a press to service a parallel link track chain is provided that includes alignment tools, disassembly tools, and reassembly tools. The alignment tools include a contact block, a plurality of block guide rods slidingly receivable within block guide rod passages of the contact block, a bridge plate for securement to a parallel link track chain, a plurality of elongated rod guides having plate guide rod passages, and a support block. The disassembly tools include a disassembly mount plate, an inner link support plate, a plurality of disassembly rods, an outer link support plate, and a disassembly tool bar having a plurality of pin bumpers. The reassembly tools include a back tool plate, a plurality of backing cups, a reassembly front tool bar having a plurality of front cups secured thereto, and a link hanger having a plurality of hanger guide rod passages.

10 Claims, 16 Drawing Sheets

(51) Int. Cl.
*B62D 55/32* (2006.01)
*B30B 15/04* (2006.01)
*B30B 15/06* (2006.01)

(58) Field of Classification Search
USPC .................................................. 59/7, 11, 25
See application file for complete search history.

(56) References Cited

U.S. PATENT DOCUMENTS

| | | | | | |
|---|---|---|---|---|---|
| 4,506,501 | A * | 3/1985 | DeVall | .................... | B21L 9/065 59/7 |
| 4,570,436 | A * | 2/1986 | Wilkie | .................... | B21L 9/065 59/7 |
| 4,766,720 | A * | 8/1988 | Martin | .................... | B21L 9/065 59/11 |
| 6,453,657 | B1 * | 9/2002 | Teravainen | ............. | B21L 9/065 59/11 |
| 6,951,096 | B2 * | 10/2005 | Maguire | ................. | B21L 21/00 59/7 |
| 7,007,360 | B2 * | 3/2006 | Huenefeld | .............. | B21L 21/00 29/252 |
| 7,100,353 | B1 * | 9/2006 | Maguire | ................. | B62D 55/32 59/11 |
| 7,797,920 | B2 * | 9/2010 | Wang | ...................... | B21L 9/065 59/11 |
| 9,174,269 | B2 * | 11/2015 | Hall | ........................ | B21L 9/065 59/11 |
| 2007/0193247 | A1 * | 8/2007 | Daniels | ................... | B21L 21/00 59/11 |

OTHER PUBLICATIONS

Komatsu PN 791-532-2201 parts sheet, first known to Applicant by at least Jan. 10, 2019, 2 pages.
FP100 Field Press Manual, Published Jun. 21, 2018, 46 pages, published by WTC Machinery LLC, Ixonia Wisconsin, USA.

* cited by examiner

LINK PRESS ASSEMBLY AND METHOD OF USE

CROSS-REFERENCE

This application claims priority to and incorporates by reference herein U.S. Provisional Patent Application Ser. No. 62/940,585 filed on Nov. 26, 2019 and Canadian Patent Applicant Serial No. 3,087,646 filed on Jul. 22, 2020.

FIELD OF THE INVENTION

This invention relates generally to servicing track chain. More particularly, the invention relates to an apparatus and method for servicing parallel link track chain assemblies for vehicles.

BACKGROUND

Many construction vehicles, such as bulldozers, cranes, etc., utilize parallel linked track chain assemblies to provide mobility. Such track chain assemblies include a series of inner and outer links bound together with pins and bushings to create a continuous flexible loop for engagement with one or more drive sprockets and passive wheel assemblies. Due to the nature of these vehicles and their use, it is not uncommon for a link to break while the vehicle is being used in the field. Such breakage requires that the track chain be repaired in the field or that the vehicle be transported to a suitable location for repair. Current methods for repairing parallel linked track chain assemblies have been plagued with numerous problems, including the need to completely remove the track chain from the vehicle and having to replace complete sub-assemblies rather than the individual broken component. Many of the problems exist due to the inability of a user to properly disassemble and reassemble the link assemblies such that existing components are not damaged and alignment is correct when assembly is complete. In addition, removal of the track chain for repair on the ground exposes the track chain to contaminants that can substantially reduce the durability and functionality of the track chain.

SUMMARY OF THE INVENTION

In at least some embodiments, a link press assembly for use with a press to service a parallel link track chain is provided that includes: alignment tools comprising: a contact block having: block guide rod passages extending therethrough; an elongated piston rod cavity on a first side; and a bar channel on an opposite second side; a plurality of block guide rods slidingly receivable within the block guide rod passages; a generally planar bridge plate for securement to a parallel link track chain, the bridge plate having a top surface, a bottom surface, and a plurality of apertures extending therethrough; a plurality of elongated rod guides secured to the top surface of the bridge plate, the rod guides further including plate guide rod passages for slidingly receiving therein the block guide rods; and a support block secured to the bridge plate and having a plurality of support pegs extending therefrom for engagement with the track chain; disassembly tools comprising: a disassembly mount plate; an inner link support plate; a plurality of disassembly rods; an outer link support plate couplable to the inner link support plate and the disassembly rods via a plurality of fasteners; and a disassembly tool bar having a plurality of pin bumpers secured thereto, wherein the disassembly tool bar is securable to the bar channel; and reassembly tools comprising: a back tool plate having a back side and a front side; a plurality of backing cups secured to the front side of the back tool plate; a reassembly front tool bar having a first side with a plurality of front cups secured thereto, wherein the reassembly front tool bar is securable to the bar channel; and a link hanger having a plurality of hanger guide rod passages for slidingly receiving the block guide rods.

In at least some other embodiments, a method of disassembling a parallel link track chain is provided, the track chain including an outboard outer link and an inboard outer link interconnected by a pair of pins having first ends, and outboard inner links and inboard inner links coupled with the pins on opposite sides of the outboard outer link and inboard outer link, and each of the outboard outer link, inboard outer link, outboard inner link, and inboard inner link including shoe bolt holes, the method comprising: providing a disassembly mount plate having a plurality of disassembly rods extending therefrom and inserting the disassembly rods through a plurality of shoe slots in both the outboard outer link and inboard outer link, to position the disassembly mount plate on an inboard side of the inboard outer link; positioning an inner link support plate between the outboard outer link and inboard outer link, and in abutment with the outboard outer link; positioning an outer link support plate against an outboard side of the outboard outer link opposite the inner link support; securing the inner link support plate and outer link support plate to the outboard outer link, and to the disassembly rods using a plurality of fasteners; securing a bridge plate to a top portion of the track chain via a plurality of fasteners and shoe nuts extending into the shoe bolt holes of the outboard inner links and inboard inner links positioned adjacent to the outboard outer link and inboard outer link, wherein a plurality of support pegs extending from the bridge plate are situated in the shoe bolt holes of the outboard outer link; sliding a plurality of block guide rods through a plurality of plate guide rod passages in a plurality of rod guides secured to the bridge plate, and at least partially securing the block guide rods relative to the rod guides; providing a contact block having block guide rod passages, a piston rod cavity on a first side, and a plurality of pin bumpers secured to a second side; sliding the block guide rod passages over the block guide rods until abutment of the pin bumpers with the first ends of the pins; positioning a press over the bridge plate with a backing plate of the press in contact with the disassembly mount plate and a press piston rod in the piston rod cavity; and actuating the piston rod towards the backing plate to push the pins out of respective pin passages in the outboard outer link.

In at least some further embodiments, a method of reassembling a parallel link track chain is provided, the track chain including an outboard outer link and an inboard outer link interconnected by a pair of pins having first ends, and outboard inner links and inboard inner links coupled with the pins on opposite sides of the outboard outer link and inboard outer link, and each of the outboard outer link, inboard outer link, outboard inner link, and inboard inner link including shoe bolt holes, the method comprising: securing a bridge plate to a top portion of the track chain via a plurality of fasteners and shoe nuts extending into the shoe bolt holes of the outboard inner links and inboard inner links positioned adjacent to the outboard outer link and inboard outer link; sliding a plurality of block guide rods through a plurality of plate guide rod passages in a plurality of rod guides secured to the bridge plate, and at least partially securing the block guide rods relative to the rod guides;

securing a link hanger having a plurality of hanger guide rod passages to the outboard outer link and sliding the hanger guide rod passages onto the block guide rods; providing a contact block having block guide rod passages, a piston rod cavity on a first side, and a plurality of front cups secured to a second side; sliding the block guide rod passages over the block guide rods until abutment of the front cups with the outboard outer link; positioning a back tool plate at an inboard side of the inboard outer link; positioning a press over the bridge plate with a backing plate of the press in contact with the back tool plate and a press piston rod in the piston rod cavity; and actuating the piston rod into to push the outboard outer link towards the backing plate until the pins are secured in respective pin passages in the outboard outer link.

In at least some additional embodiments a link press assembly is provided that includes alignment tools, disassembly tools, and reassembly tools.

In at least some further additional embodiments a method of servicing a parallel link track chain is provided that includes utilizing alignment tools, disassembly tools, and reassembly tools.

BRIEF DESCRIPTION OF THE DRAWINGS

Embodiments of the invention are disclosed with reference to the accompanying drawings and are for illustrative purposes only. The invention is not limited in its application to the details of construction or the arrangement of the components illustrated in the drawings. The invention is capable of other embodiments or of being practiced or carried out in other various ways. In the drawings.

DETAILED DESCRIPTION

Figure 1:
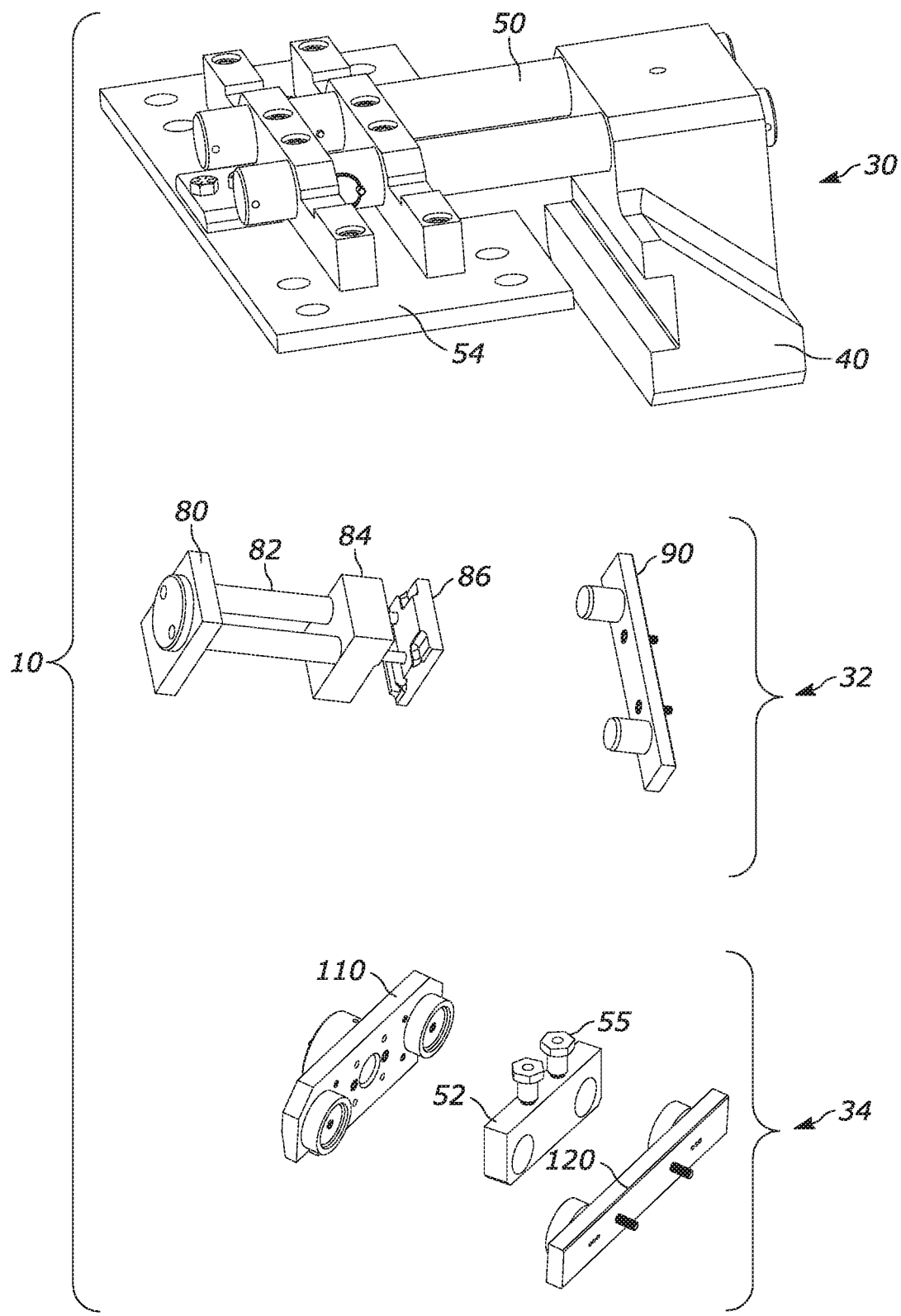
FIG. 1 is a perspective view of an exemplary embodiment of a link press assembly including alignment tools, disassembly tools, and reassembly tools.
Figure 2:
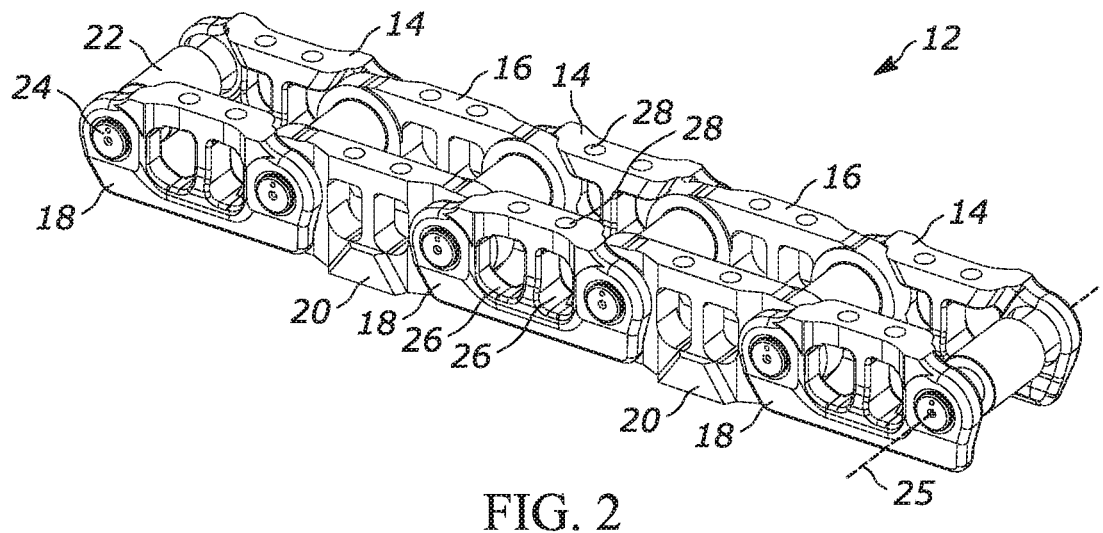
FIG. 2 is a perspective view of an embodiment of an exemplary portion of a parallel link track chain for a vehicle.
Figure 3:
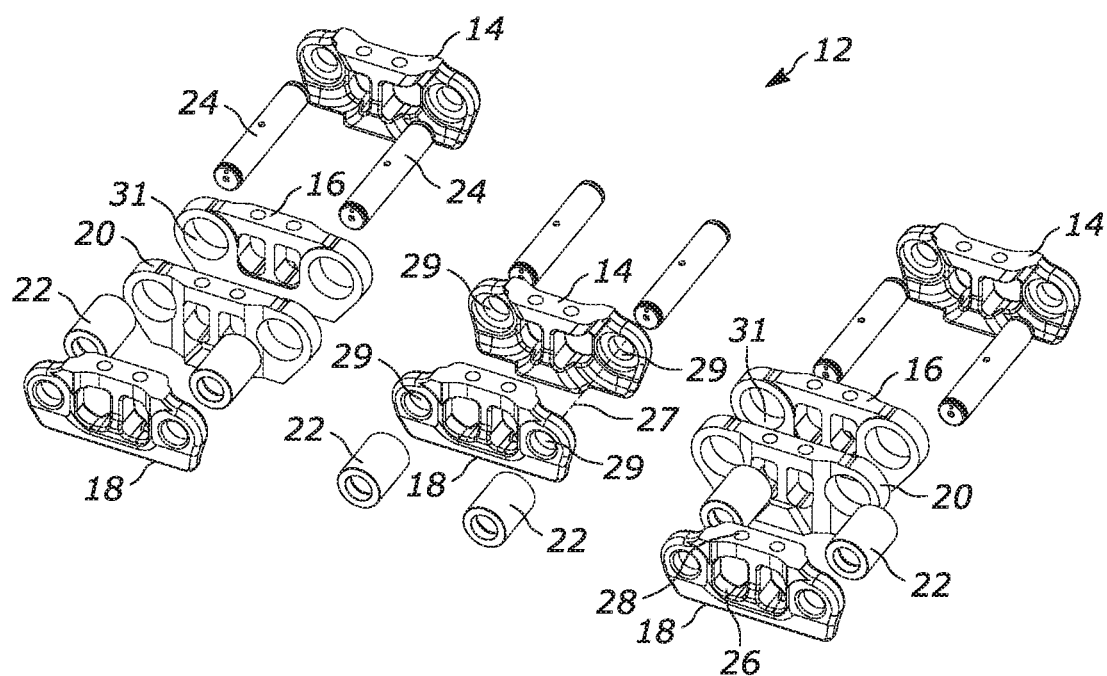
FIG. 3 is an exploded view of the parallel link track chain of FIG. 2.
Figure 4:
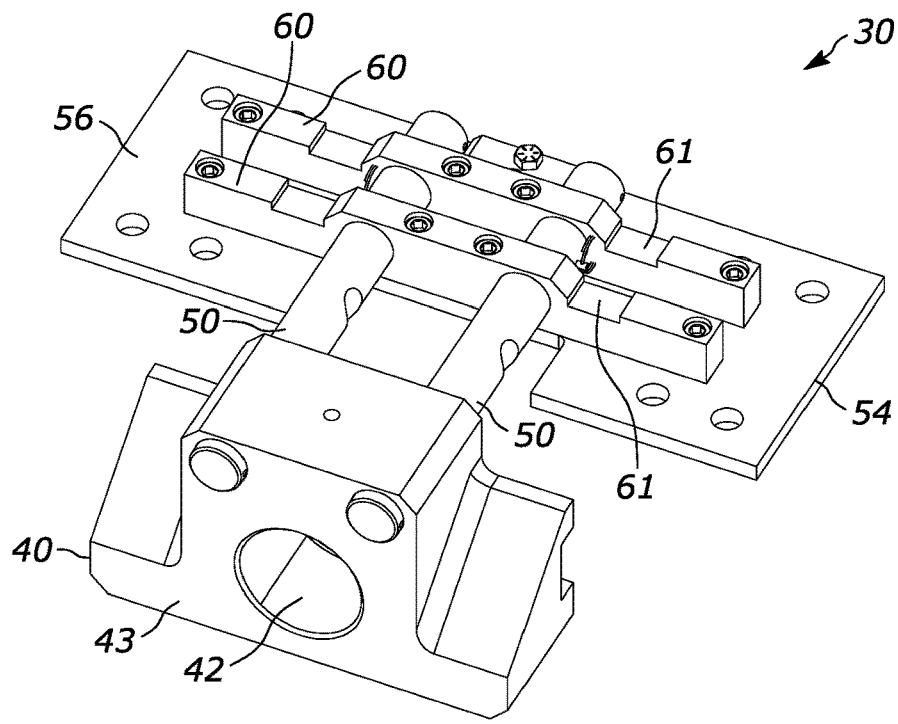
FIG. 4 is a top perspective view of the alignment tools of FIG. 1.
Figure 5:
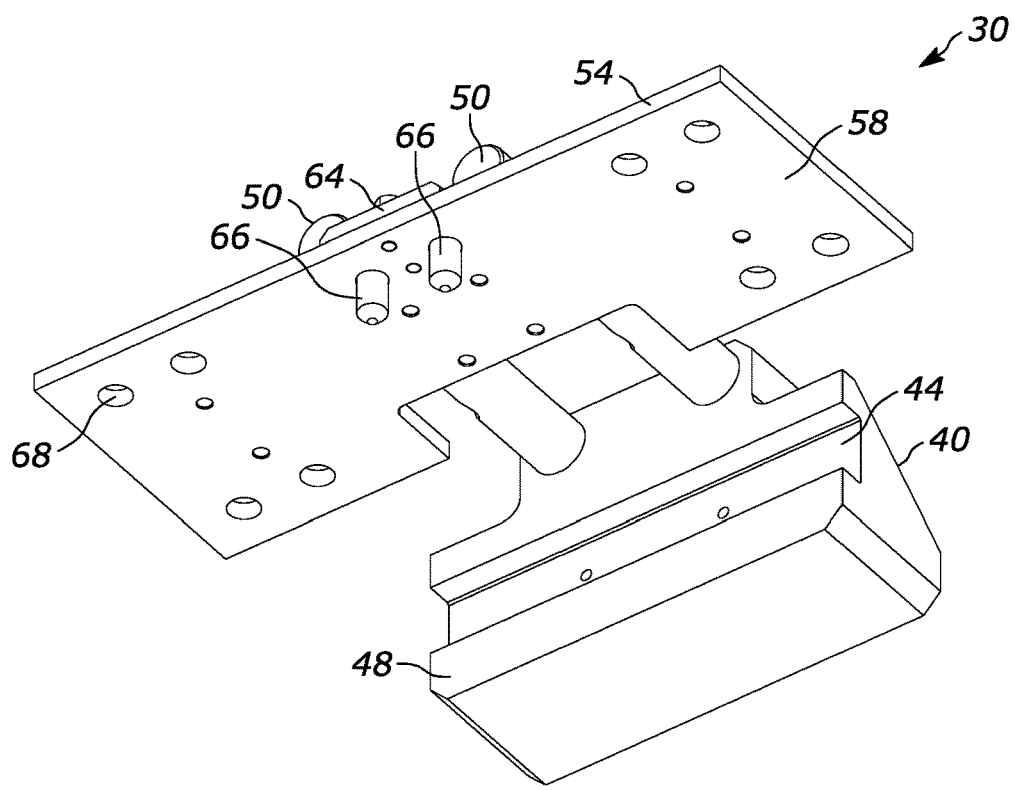
FIG. 5 is a bottom perspective view of the alignment tools of FIG. 1.
Figure 6:
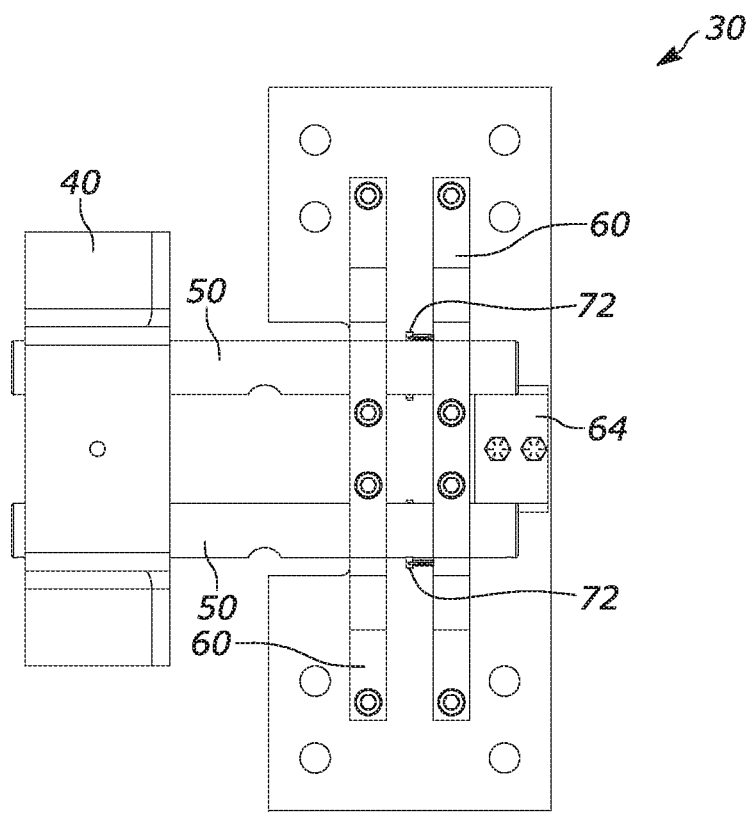
FIG. 6 is a top view of the alignment tools of FIG. 1.
Figure 7:
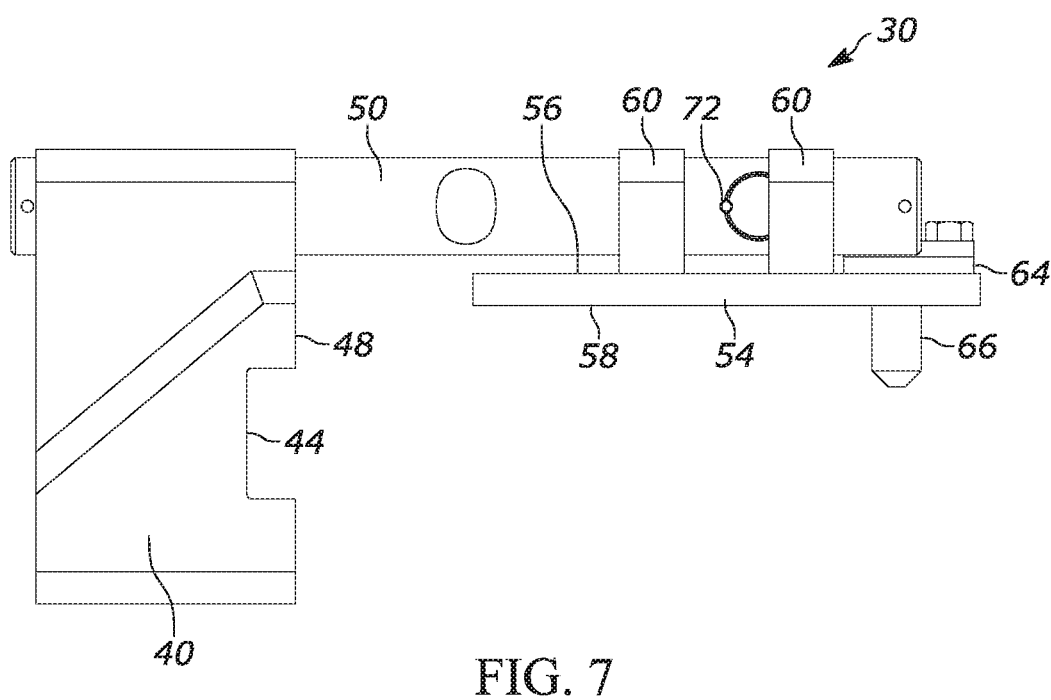
FIG. 7 is a side view of the alignment tools of FIG. 1.
Figure 8:
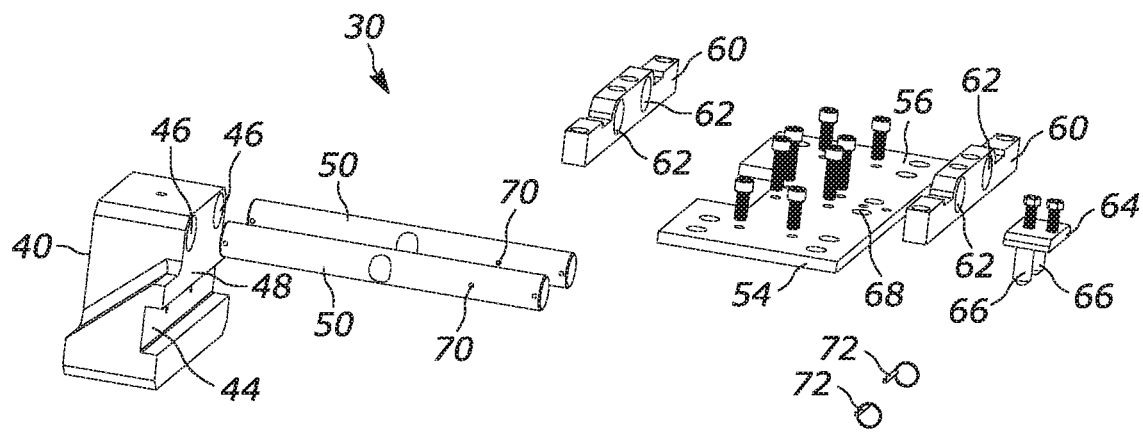
FIG. 8 is a perspective exploded view of the alignment tools of FIG. 1.
Figure 9:
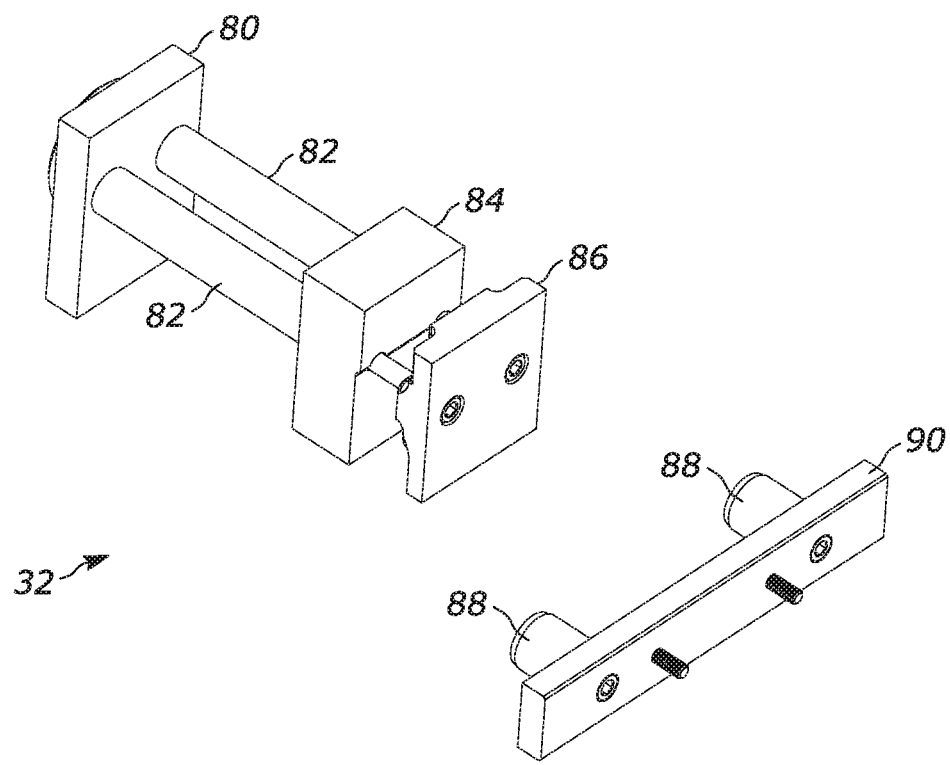
FIG. 9 is a top perspective view of the disassembly tools of FIG. 1.
Figure 10:
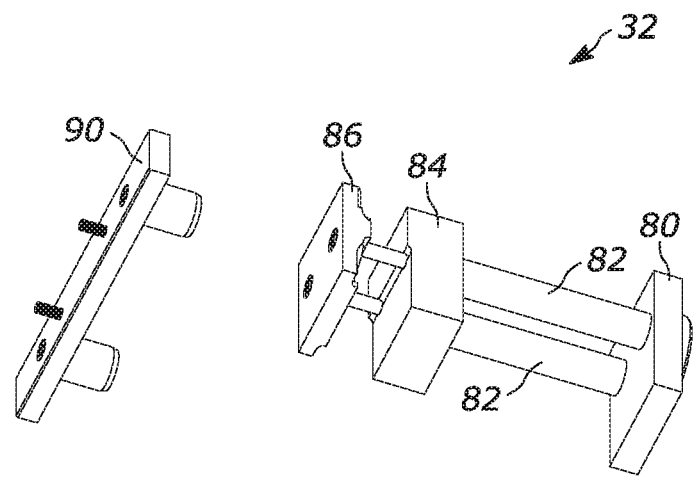
FIG. 10 is a bottom perspective view of the disassembly tools of FIG. 1.
Figure 11:
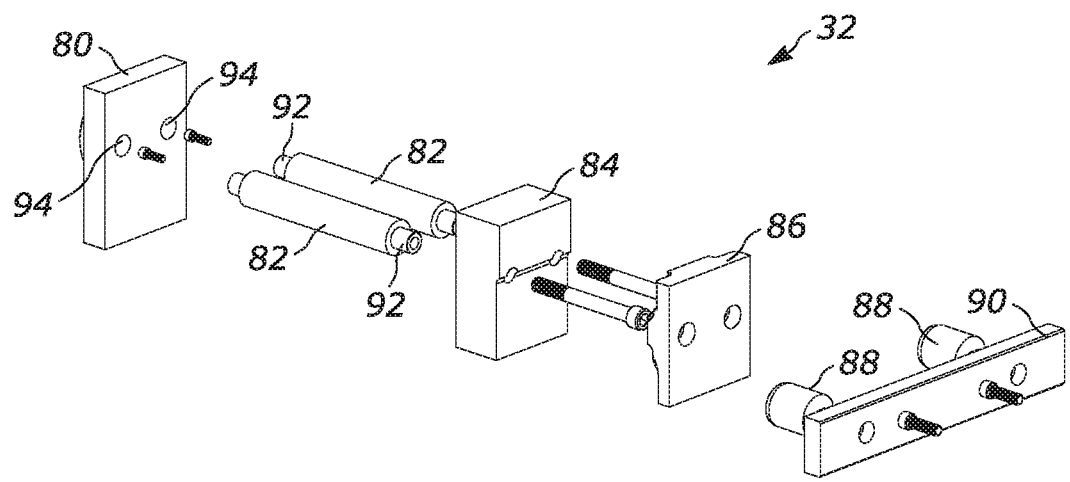
FIG. 11 is an exploded front perspective view of the disassembly tools of FIG. 1.
Figure 12:
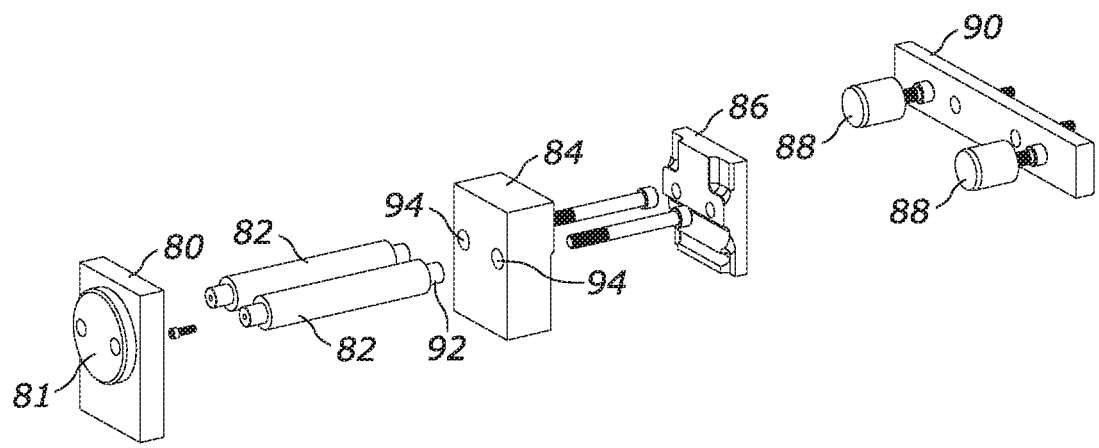
FIG. 12 is an exploded rear perspective view of the disassembly tools of FIG. 1.

FIG. 1 illustrates an exemplary embodiment of a link press assembly 10. The link press assembly 10 is used to repair a parallel link track chain 12 on a vehicle, such as a construction vehicle. As shown in FIGS. 2 and 3, an exemplary typical parallel link track chain 12 includes pluralities of outboard outer links 14, outboard inner links 16, inboard outer links 18, inboard inner links 20, bushings 22, and track pins 24. The pins 24 are press fit into the outboard outer links 14 and inboard outer links 18, and can be further secured using wedge rings (not shown) that clip to the ends of the pins 24. Each pin 24 includes a central longitudinal axis 25. The links 14, 16, 18, 20 further include shoe slots 26 extending therethrough. In addition, the various links 14, 16, 18, 20 include shoe bolt holes 28 for securing track shoes (not shown) and the outboard outer links 14 and inboard outer links 18 include pin passages 29 for receiving and securing (via press fit) the pins 24 therein, while the outboard inner links 16 and inboard inner links 20 include enlarged pin passages 31 sized to receive the bushings 22 and pins 24 therethrough. For reference, the term "outboard" refers to the side of the parallel link track chain 12 that generally faces away from the vehicle it is installed on, while "inboard" refers to the side generally facing the vehicle. Parallel link track chains 12 are well known in the industry and can vary in size and shape depending on the type of vehicle, etc., as such it shall be understood that modifications can be made to the link press assembly 10 to accommodate various parallel link track chains while providing the same general functionality as described herein.

Referring again to FIG. 1, the link press assembly 10 includes various components used for the disassembly and reassembly of the parallel link track chain 12. More particularly, the link press assembly 10 includes alignment tools 30, disassembly tools 32, and reassembly tools 34. The alignment tools 30 are used with the disassembly tools 32 to disassemble the parallel link track chain 12 to facilitate replacement of one or more broken components, such as links, bushings, pins, etc. The alignment tools 30 are used with the reassembly tools 34 to reassemble the parallel link track chain 12 with the new component(s). Although each of the alignment tools 30, disassembly tools 32, and reassembly tools 34 are shown with specific components grouped together, it shall be understood that in at least some embodiments, some components can be omitted and others can be added, depending on the parallel link track chain 12 and the parallel link track chain components being replaced. In addition, it shall be understood that the various components of the alignment tools 30, disassembly tools 32, and reassembly tools 34 can vary in size and shape to accommodate larger or smaller parallel link track chains 12 as well as variations in the various apertures of such parallel link track chains 12.

Referring to FIGS. 4-8, various views are provided of an exemplary embodiment of the alignment tools 30. The alignment tools 30 include a contact block 40 having a plurality of block guide rod passages 46 extending therethrough, a piston rod cavity 42 on a first side 43, and a bar channel 44 on an opposite second side 48. In at least some embodiments, the piston rod cavity 42 is sized and shaped to matingly receive the piston rod of a press therein. In at least some embodiments, the piston rod cavity 42 is cylindrical, although other shapes can be utilized to accommodate differently shaped piston rods. A plurality of block guide rods 50 are provided that are sized and shaped to be slidingly received therein and therethrough the block guide rod passages 46.

The alignment tools 30 further include a generally planar bridge plate 54 having top surface 56 and a bottom surface 58. A plurality of elongated rod guides 60 are secured to the top surface 56, with the rod guides 60 further including plate guide rod passages 62 that are sized and shaped to slidingly receive therein and therethrough the block guide rods 50. A support block 64 having a plurality of support pegs 66 extending therefrom that are sized and shaped to be received in a plurality of apertures 68 in the bridge plate 54. The block guide rods 50 further include pin holes 70 for receiving quick release rod pins 72. The alignment tools 30 are used with the disassembly tools 32 when disassembling a parallel link track chain 12, and also used with the reassembly tools 34 when reassembling a parallel link track chain 12.

Referring to FIGS. 9-12, various views are provided of an exemplary embodiment of the disassembly tools 32. The disassembly tools 32 can include a disassembly mount plate 80, a plurality of disassembly rods 82, an inner link support plate 84, an outer link support plate 86, and a plurality of pin bumpers 88 secured to a disassembly tool bar 90. The disassembly rods 82 can include reduced diameter ends 92 for receipt within rod stop cavities 94 formed in both the disassembly mount plate 80 and inner link support plate 84.

Figure 13:
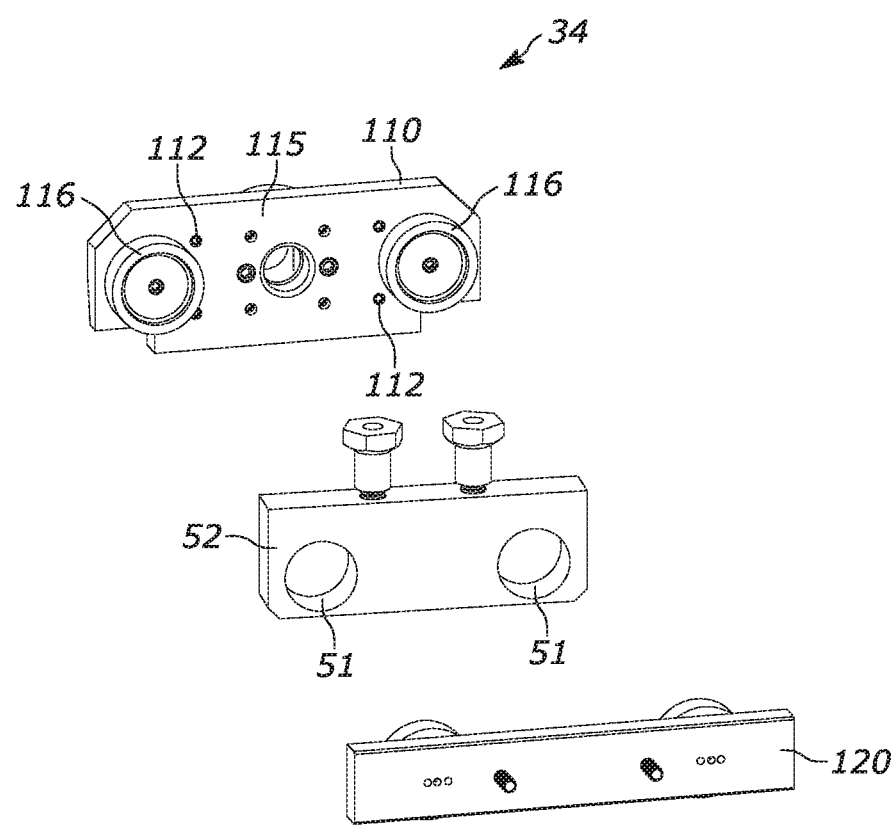
FIG. 13 is a bottom perspective view of the reassembly tools of FIG. 1.
Figure 14:
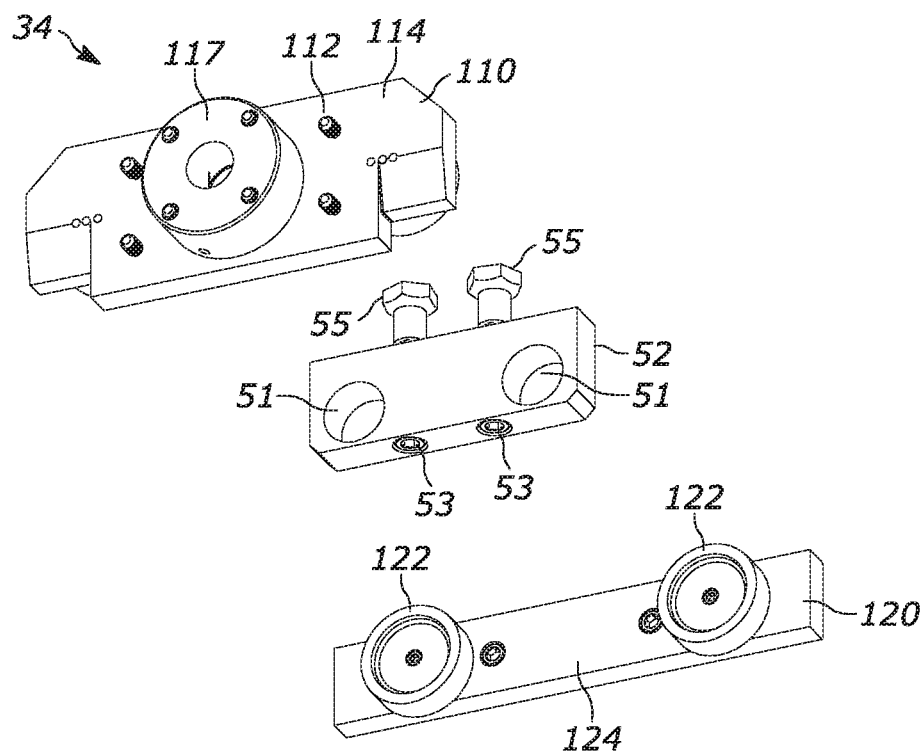
FIG. 14 is a top perspective view of the reassembly tools of FIG. 1.
Figure 15:
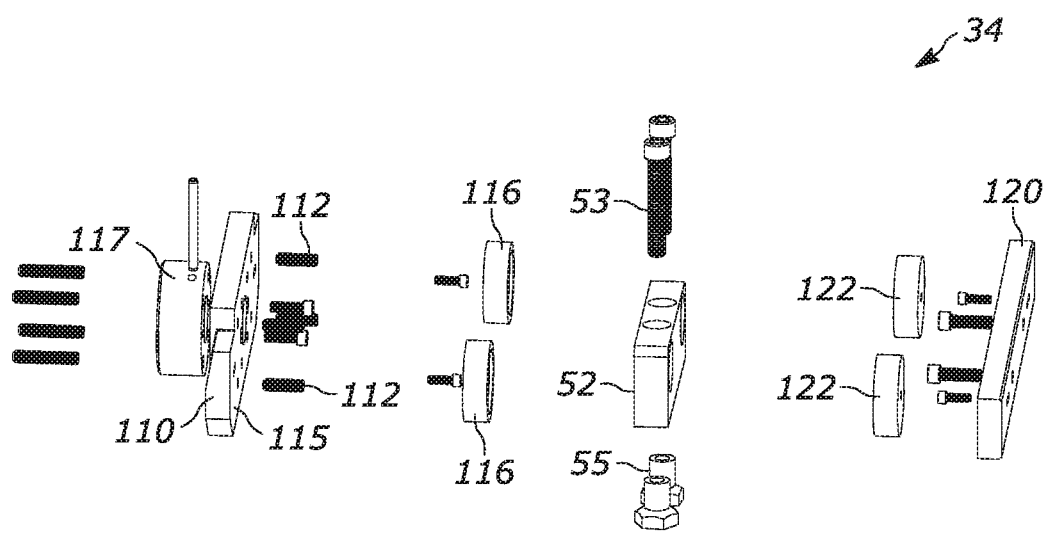
FIG. 15 is an exploded side perspective view of the reassembly tools of FIG. 1.
Figure 16:
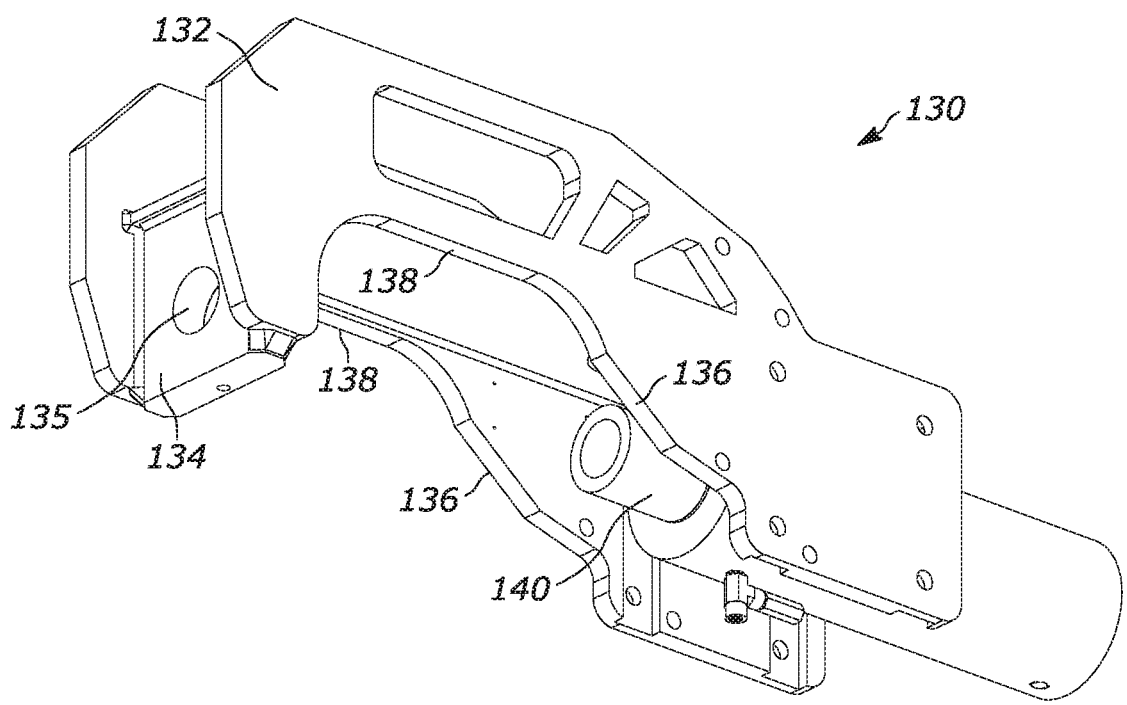
FIG. 16 is a perspective view of an exemplary field press.

Referring to FIGS. 13-15, various views are provided of an exemplary embodiment of the reassembly tools 34. The reassembly tools 34 can include a back tool plate 110 having a plurality of frame contact set screws 112 extending perpendicularly from a back side 114, and a plurality of backing cups 116 secured to a front side 115. The frame contact set screws 112 can be adjusted as necessary to ensure contact with a backing plate 134 (FIG. 16). The back tool plate 110 can include a plate press engagement portion 117 which is sized and shaped to be matingly received within an aperture 135 in the backing plate 134 to maintain the positioning of the back tool plate 110. A reassembly front tool bar 120 is also provided having a plurality of front cups 122 secured to a first side 124 of the reassembly front tool bar 120. A link hanger 52 is provided that includes hanger guide rod passages 51 that are sized and shaped to slidingly receive therein and therethrough the block guide rods 50. Link fasteners 53 and shoe nuts 55 are also provided.

Referring to FIG. 16, illustrated is an exemplary known field press 130, such as a model FP100 Field Press, as manufactured by WTC Machinery of Ixonia, Wis. The link press assembly 10 is used with the field press 130, wherein the field press 130 provides a motive force to effectuate movement of the various tools. Although the illustrated field press 130 is shown with the link press assembly 10, various other types of field presses can also be utilized. It shall be understood that variations in the shapes and sizes of other field presses can be accommodated as desired with via modifications to one or more components of the link press assembly 10. As such, the link press assembly 10 is adaptable and configurable for use with various types of field presses. As seen in FIG. 16, the field press includes a generally C-shaped body 132 having a backing plate 134 and front sidewalls 136, each extending on opposite sides of a support wall 138 and configured to be placed over a parallel link track chain 12. The field press 130 further includes a piston rod 140 actuatable longitudinally towards and away from a backing plate front surface 137 of the backing plate 134. The piston rod 140 is generally actuatable via a connection to a hydraulic supply line of the vehicle or another source of power.

As is common, various components of a vehicle parallel link track chain 12 can break or otherwise become unusable while being operated in the field. Most breakages require the removal of one or more links 14, 16, 18, 20. To remove one or more links 14, 16, 18, 20 the associated pins 24 must be removed. To remove the pins 24 and disassemble the parallel link track chain 12, a user first removes adjacent shoes secured to the parallel link track chain 12 at the shoe bolt holes 28. Generally only a small amount of track shoes need to be removed (e.g., three shoes), to provide access for the link press assembly 10 to be used. The parallel link track chain 12 can be serviced without removal from the vehicle, although it can also be serviced off the vehicle if desired.

Figure 17:
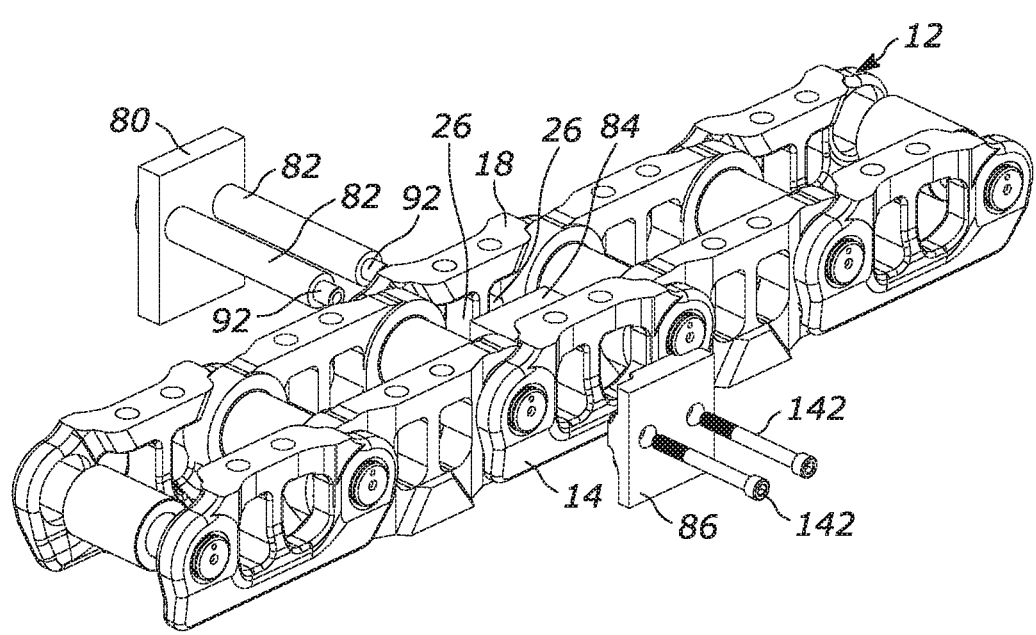
FIG. 17 is a perspective view showing the parallel link track chain with portions of the disassembly tools partially installed.

To disassemble the parallel link track chain 12 (e.g., to replace a link, etc.), various alignment tools 30 and disassembly tools 32 are utilized. Referring to FIG. 17, a perspective view of the parallel link track chain 12 is shown with portions of the disassembly tools 32 partially installed. More particularly, the inner link support plate 84 is positioned inside the parallel link track chain 12 against the outboard outer link 14, while the outer link support plate 86 is positioned on the opposite side of the outboard outer link 14. The disassembly rods 82 are secured to the disassembly mount plate 80 and passed through the shoe slots 26 of the inboard outer link 18, with the unsecured ends 92 inserted into the rod stop cavities 94 of the inner link support plate 84. Once installed, fasteners 142 secure the arrangement of the outer link support plate 86, the disassembly rods 82, and inner link support plate 84 about the parallel link track chain 12, with the inner link support plate 84 and outer link support plate 86 firmly secured to the outboard outer link 14, as shown in FIG. 18.

When disassembling the parallel link track chain 12, it is important to maintain correct alignment as the pins 24 are pressed out of the parallel link track chain 12. More particularly, it is desirable to drive the pins 24 along a path that follows a central longitudinal axis 27 (FIG. 3) that passes through the pin passages 29 of the outboard outer link 14 and the inboard outer link 18 as they are aligned when assembled, the central longitudinal axis 27 extends directly perpendicular to the outer face of the links. The alignment tools 30 provide such alignment during removal and insertion of the pins 24.

Figure 18:
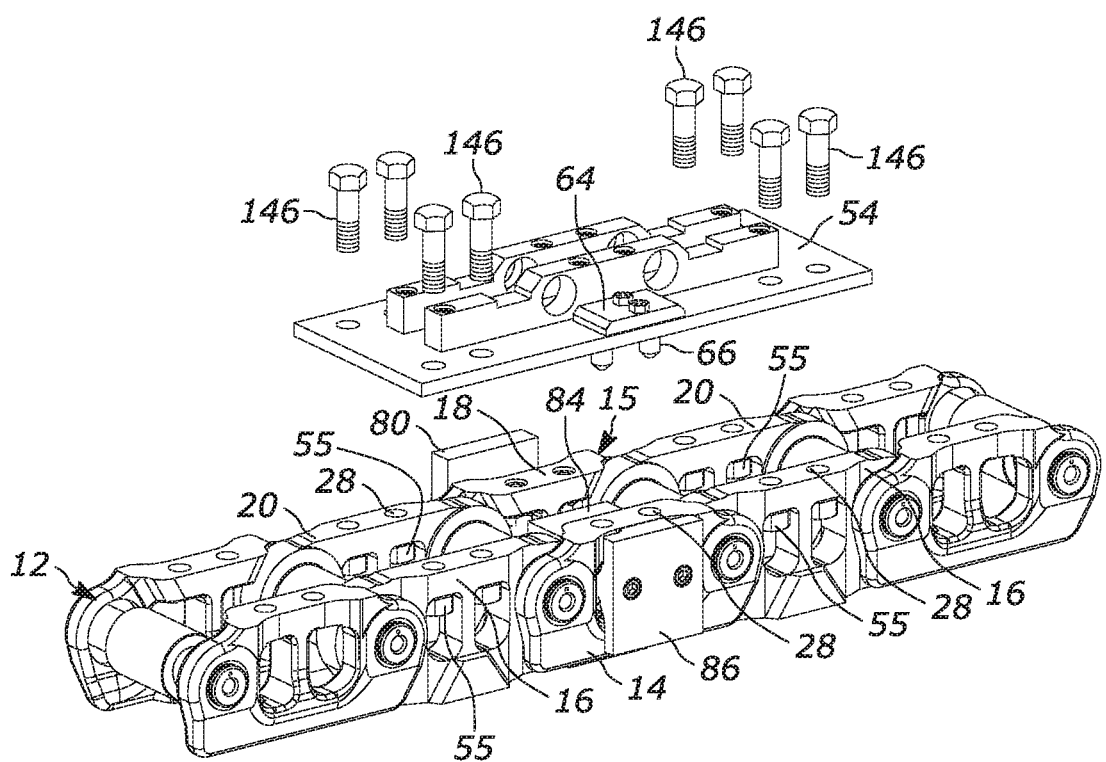
FIG. 18 is a perspective view of the disassembly tools installed on the parallel link track chain and various alignment tools prior to installation.
Figure 19:
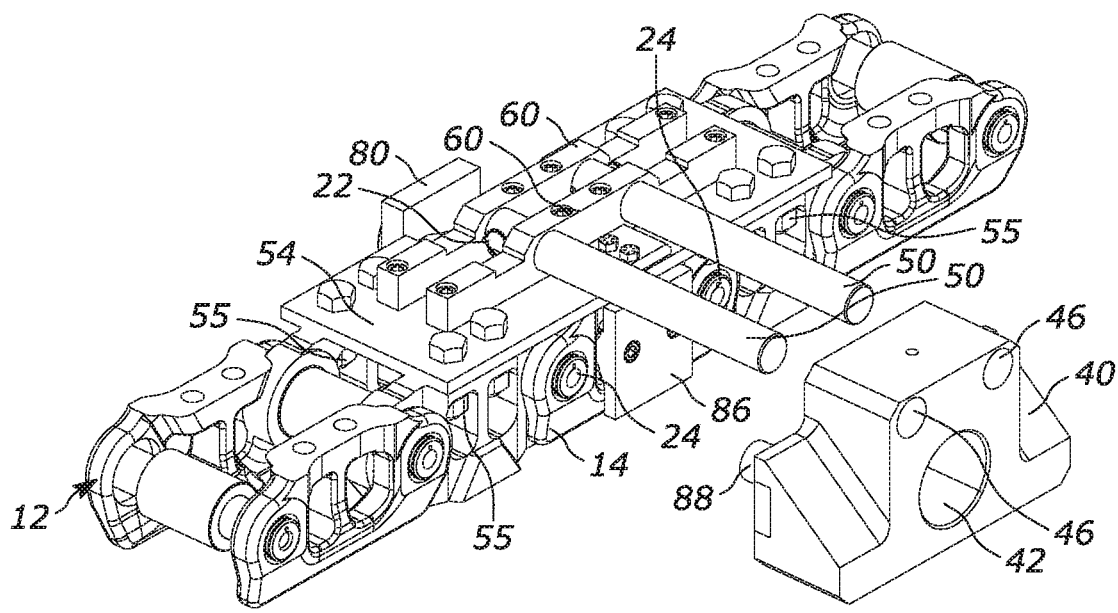
FIG. 19 is a perspective view of various alignment tools partially installed on the parallel link track chain.
Figure 20:
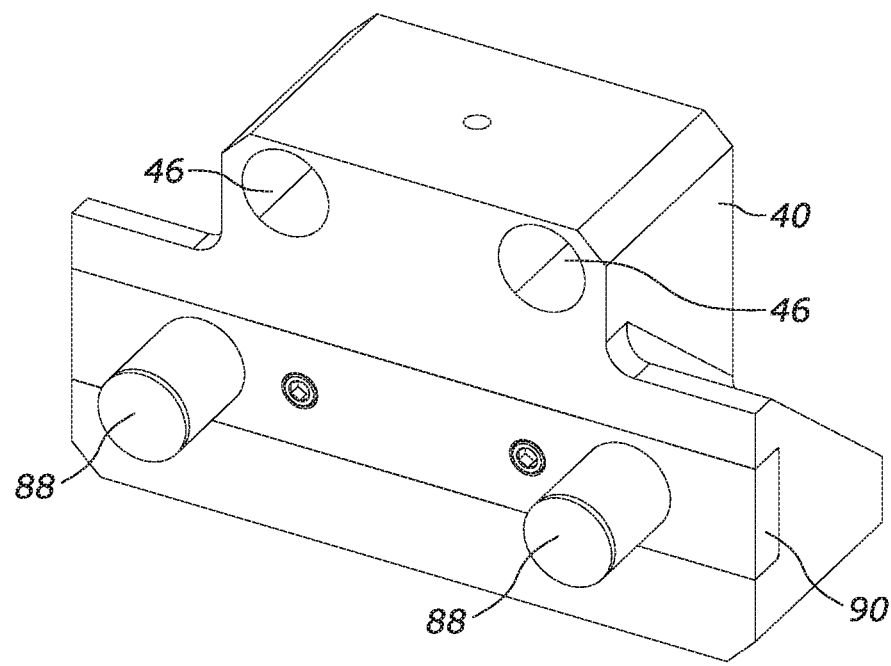
FIG. 20 is a perspective view of the contact block with the disassembly tool bar installed.
Figure 21:
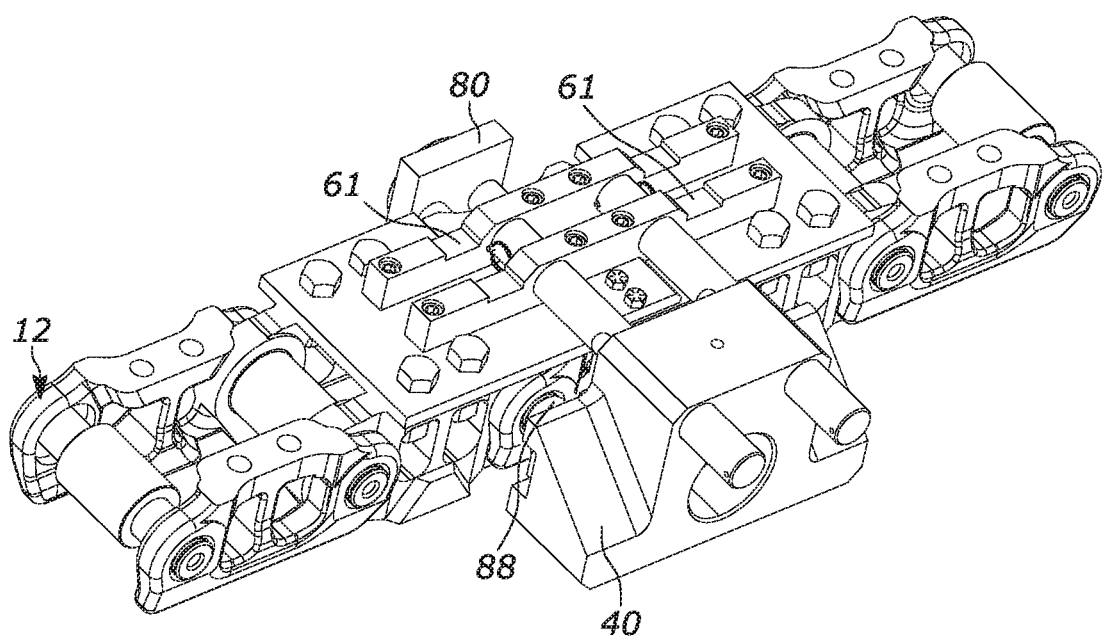
FIG. 21 is a perspective view of the alignment tools and disassembly tools installed on the parallel link track chain.

Referring to FIGS. 18 and 19, the bridge plate 54 with the support block 64 secured thereto is installed to a top portion 15 of the parallel link track chain 12 with the support pegs 66 sliding into the shoe bolt holes 28 of the outboard outer link 14. The bridge plate 54 is secured to the directly adjacent inboard inner links 20 and outboard inner links 16 that are positioned on opposite sides of the outboard outer link 14 and inboard outer link 18 using a plurality of fasteners 146 that are inserted in the shoe bolt holes 28 and secured with shoe nuts 55 to secure the bridge plate 54 in place. Referring additionally to FIG. 20, the disassembly tool bar 90 with the pin bumpers 88 is secured to the bar channel 44 of the contact block 40. As seen in FIG. 19, the block guide rods 50 are inserted into the plate guide rod passages 62 of the rod guides 60 such that the pin holes 70 are positioned between the rod guides 60 and the rod pins 72 are secured thereto to retain the block guide rods 50 to the bridge plate 54. The block guide rods 50 should be rotated to position the rod pins 72 out of the way of tooling to avoid interference with the field press 130 during pressing. Finally, as seen in FIG. 21, the contact block 40 with the disassembly tool bar 90 installed is positioned by sliding the block guide rods 50 through the block guide rod passages 46 until the pin bumpers 88 abut the pins 24 to be removed.

Figure 22:
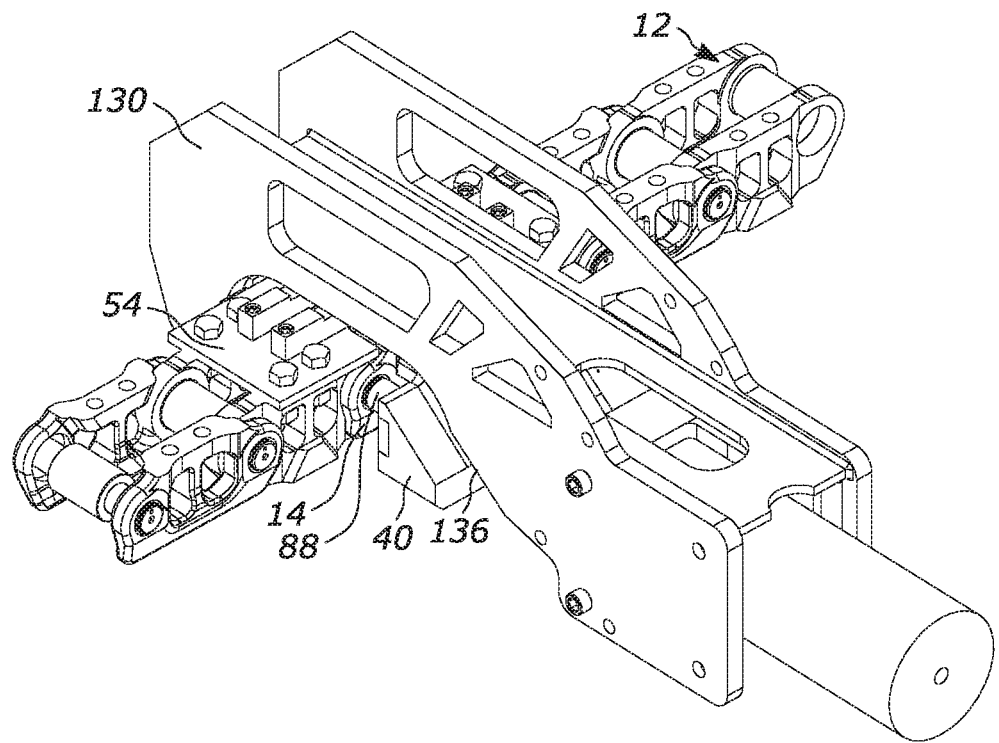
FIG. 22 is a top perspective view of the disassembly tools, alignment tools, and field press installed about the parallel link track chain prior to disassembly.
Figure 23:
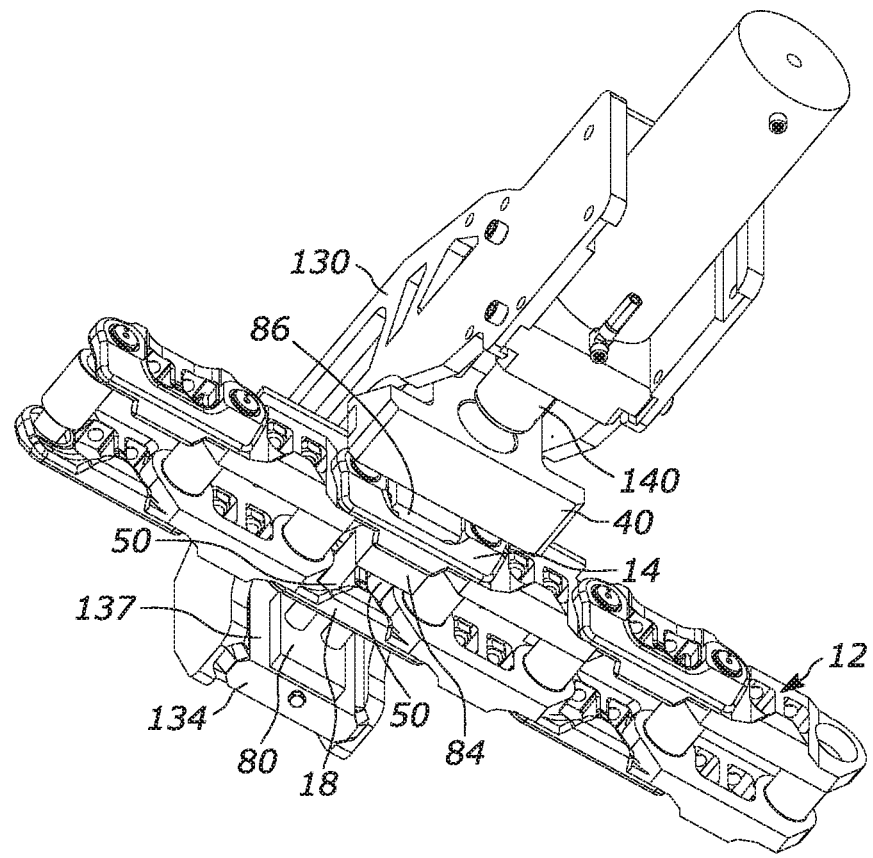
FIG. 23 is a bottom perspective view of the disassembly tools, alignment tools, and field press installed about the parallel link track chain prior to disassembly.

Referring to FIGS. 22 and 23, with the disassembly tools 32 and alignment tools 30 in position about the parallel link track chain 12, the field press 130 is positioned about the parallel link track chain 12. More particularly, the body 132 is placed over the bridge plate 54 with the support walls 138 resting in a pair of guide notches 61 in each of the rod guides 60; a mount press engagement portion 81 (see FIG. 12) extends from and/or is secured to the disassembly mount plate 80, which is sized and shaped to be matingly received within the aperture 135 in the backing plate 134 to maintain the positioning of the disassembly mount plate 80. In at least some embodiments, other engagement configurations can be utilized between the disassembly mount plate 80 and the backing plate 134. Further, the piston rod 140 is aligned with the piston rod cavity 42. It is noted that the backing plate 134 is generally positioned on the inboard side of the track chain due to clearance issues other vehicle structure.

Figure 24:
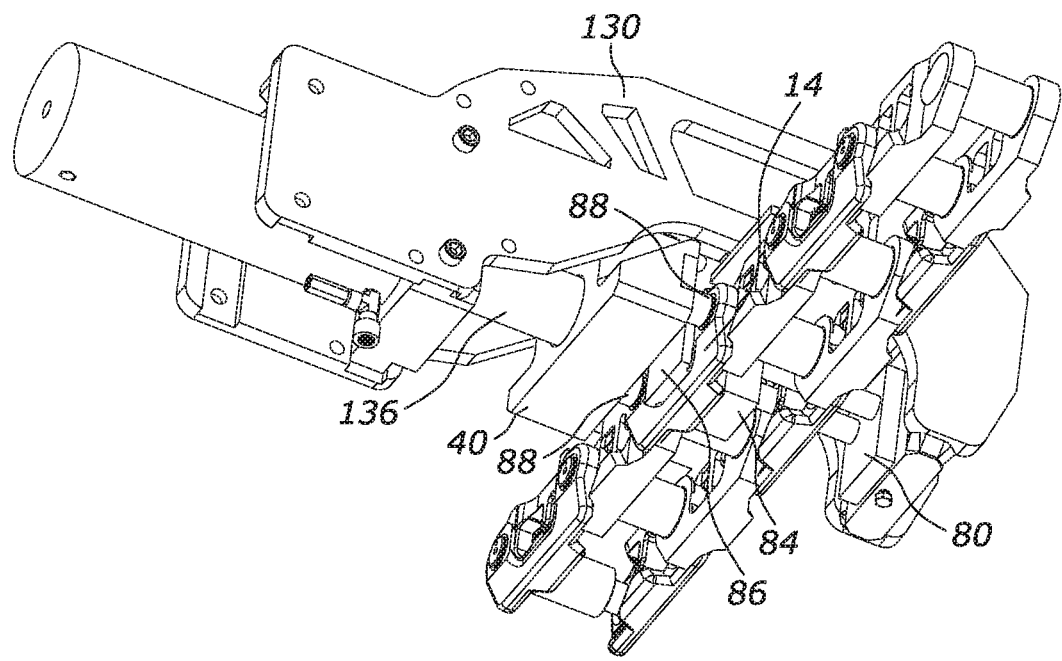
FIG. 24 is a bottom perspective view of the disassembly tools, alignment tools, and field press installed about the parallel link track chain during disassembly.
Figure 25:
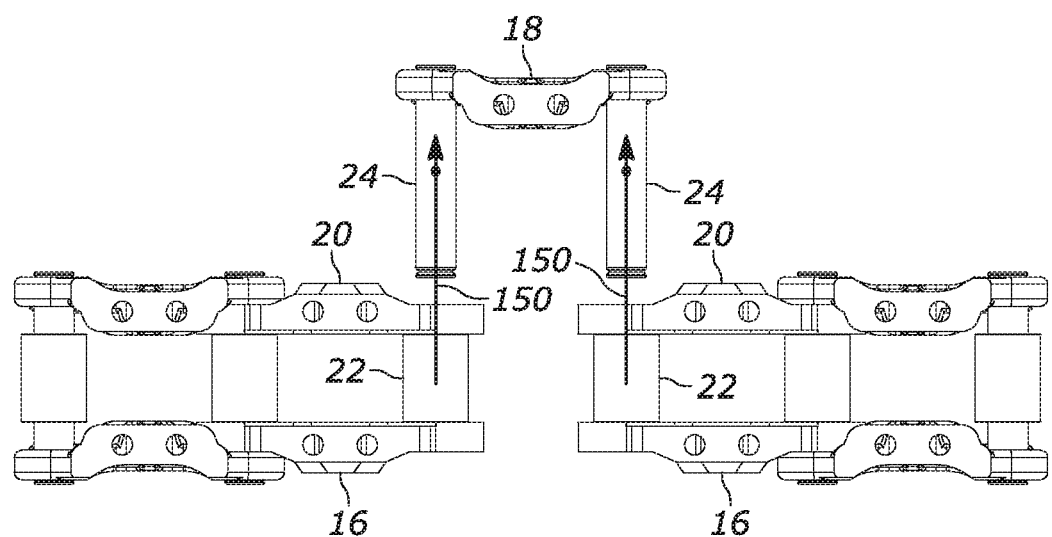
FIG. 25 is a top view of a portion of the parallel link track chain and illustrating the disassembly movement of the pins and the inboard outer link.

Referring to FIG. 24, the piston rod 140 is actuated to enter and fully engage the piston rod cavity 42, then the piston rod 140 is further actuated to press the pin bumpers 88 into the pin passages 29 of the outboard outer link 14 as the two pins 24 abutted with the pin bumpers 88 are pushed out of the outboard outer link 14. The mating configuration between the piston rod 140 and the piston rod cavity 42 serve to maintain perpendicular alignment of the second side 48 of the contact block 40 (i.e., parallel alignment of the pin bumpers 88) as it is actuated inward. FIG. 25 illustrates a portion of the parallel link track chain 12 and the general movement of the pins 24 and the inboard outer link 18 along arrows 150, noting the pins 24 remain secured to the inboard outer link 18 as they are pushed out of the outboard outer link 14. It is noted that the disassembly tools 32 maintain the position of the outboard outer link 14 relative to the backing plate 134 by securing the outboard outer link 14 between the inner link support plate 84 and the outer link support plate 86, with the inner link support plate 84 held in position relative to the backing plate 134 by the disassembly mount plate 80 and disassembly rods 82 that provide fixed clearance for the pins 24 and the inboard outer link 18 to move out relative to the parallel link track chain 12. The pin bumpers 88 can generally be actuated until abutment of the second side 48 of the contact block 40 with the outer link support plate 86, at which point the piston rod 140 can be retracted and the field press 130, disassembly tools 32, and alignment tools 30 can be removed. If the outboard outer link 14 is the only component being replaced, then the pins 24 and the inboard outer link 18 do not have to be further removed from the parallel link track chain 12, otherwise the parallel link track chain 12 should be secured from falling off the vehicle prior to removing the assembly of the pins 24 and inboard outer link 18. For example, an appropriately rated chain or come-along can be used to hold parallel link track chain 12 securely in place.

Figure 26:
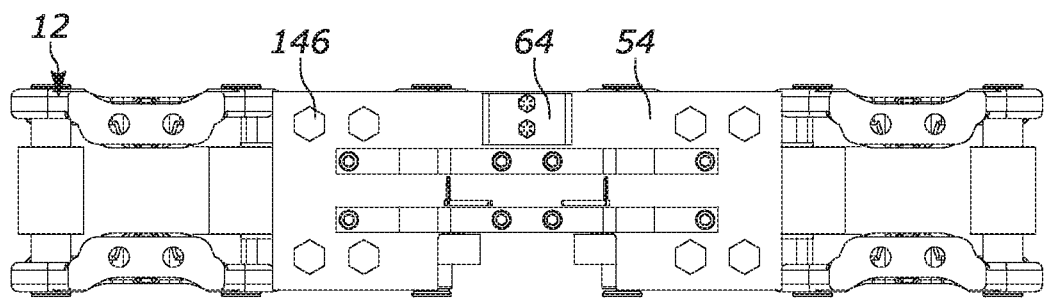
FIG. 26 is a top view of the parallel link track chain with the bridge plate installed for reassembly.

Reassembly of the disassembled parallel link track chain 12 with the replacement component(s) (e.g., link, pin, bushing, etc.) is begun by inserting the assembled the pins 24 secured to the inboard outer link 18 (these can be new replacement parts or the original parts if replacement was not necessary) through the enlarged pin passages 31 of the adjacent outboard inner links 16 and inboard inner links 20, and through the bushings 22. Referring to FIG. 26, the bridge plate 54 is reinstalled on the top portion 15 of the parallel link track chain 12, but oriented 180 degrees from the disassembly position, such that the support pegs 66 of the support block 64 are now positioned in the shoe bolt holes 28 of the inboard outer link 18 instead of the outboard outer link 14. The fasteners 146 and shoe nuts 55 secure the bridge plate 54 to the parallel link track chain 12.

Figure 27:
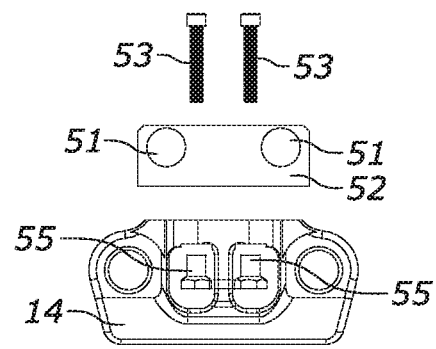
FIG. 27 is a side view of the link hanger and the outboard outer link prior to securement of the link hanger to the outboard outer link.
Figure 28:
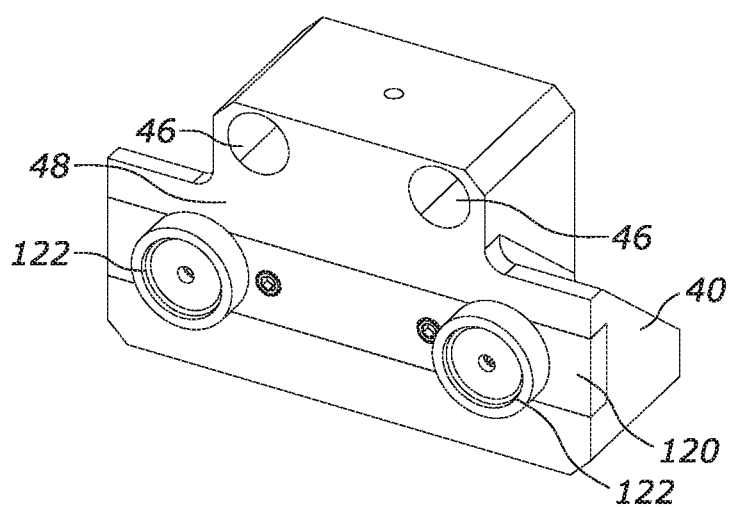
FIG. 28 is a perspective view of the contact block with the reassembly front tool bar secured thereto.
Figure 29:
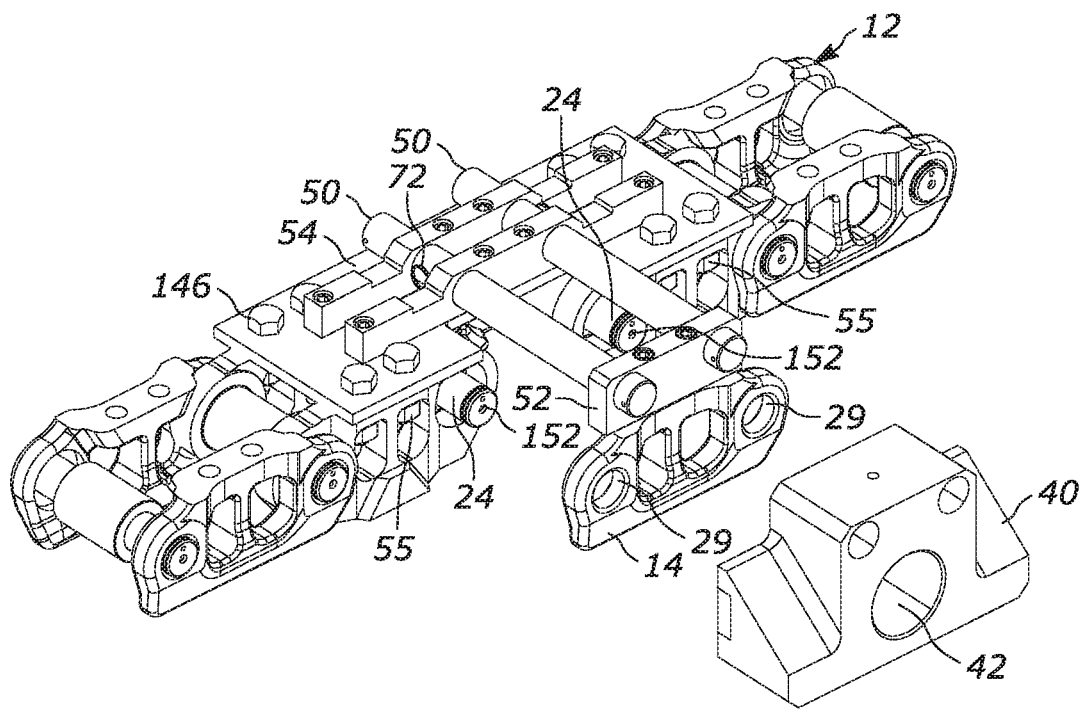
FIG. 29 is a perspective view of the parallel link track chain with various alignment tools coupled thereto.
Figure 30:
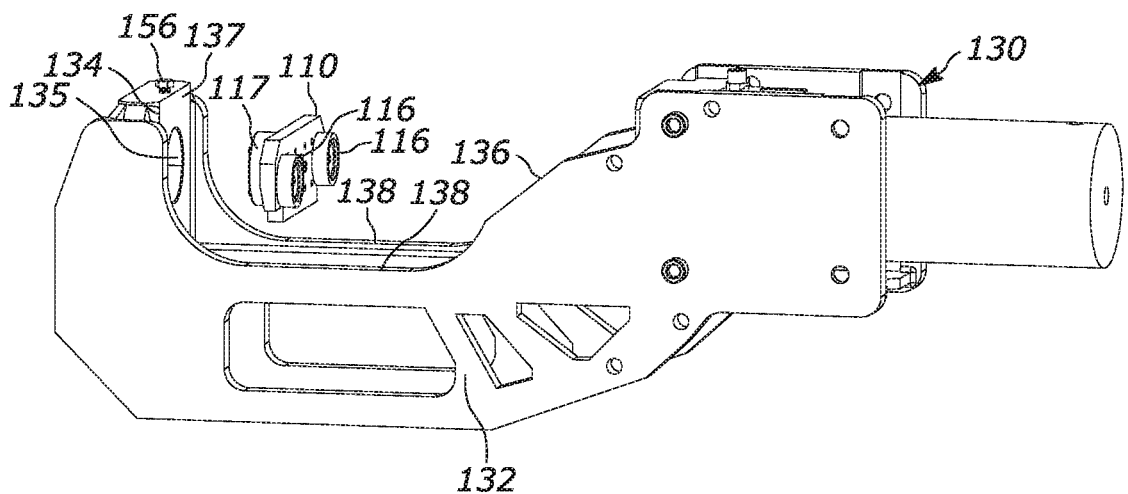
FIG. 30 is a perspective view of the field press and the back tool plate.

Referring to FIG. 27, the link hanger 52 is shown positioned for installation on the outboard outer link 14. The link hanger 52 is placed on top of the outboard outer link 14 and the link fasteners 53 are fed down through the shoe bolt holes 28 and secured to the shoe nuts 55 that are passed through the shoe slots 26 and positioned underneath the shoe bolt holes 28. Referring to FIG. 28, the reassembly front tool bar 120 is secured to the contact block 40. Referring to FIG. 29, with the bridge plate 54 secured to the parallel link track chain 12, the block guide rods 50 are inserted through the plate guide rod passages 62 of the rod guides 60 and secured with the rod pins 72, as during disassembly. The link hanger 52 is then positioned on the block guide rods 50 by passing the block guide rods 50 through the hanger guide rod passages 51. The contact block 40 can then be slid onto the block guide rods 50 via the block guide rod passages 46 until the pin passages 29 of the outboard outer link 14 are positioned at the pin ends 152 of the pins 24. Referring to FIG. 30, the back tool plate 110 is positioned on the field press 130 and in abutment with the backing plate front surface 137 of the backing plate 134. The plate press engagement portion 117 is matingly received within the aperture 135 in the backing plate 134 and the backing cups 116 are faced towards the piston rod 140. A lock bolt 156 can be provided in the backing plate 134 to further secure the back tool plate 110 (the lock bolt can also be used during disassembly to secure the disassembly tool bar 90).

Figure 31:
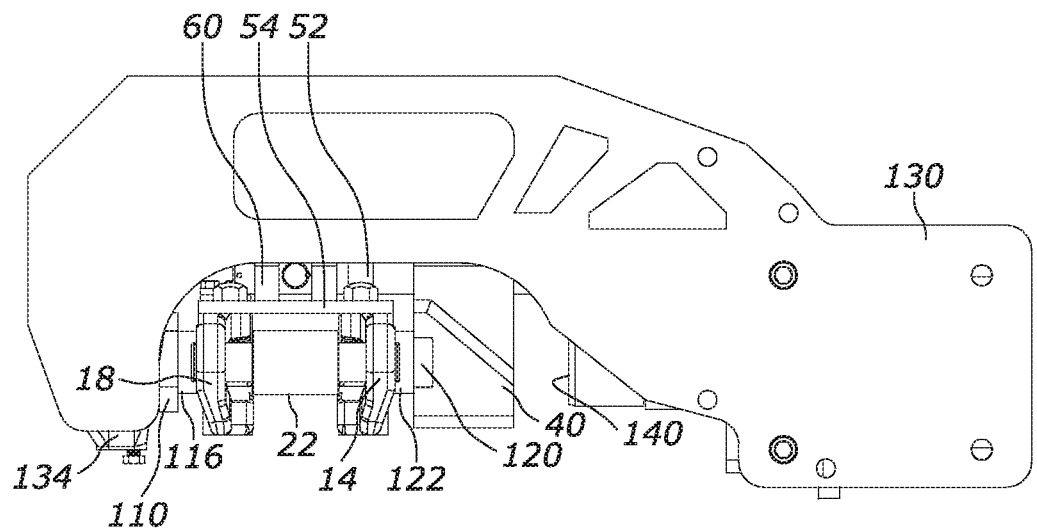
FIG. 31 is a side view of the field press, alignment tools, and reassembly tools coupled to the parallel link track chain for reassembly.
Figure 32:
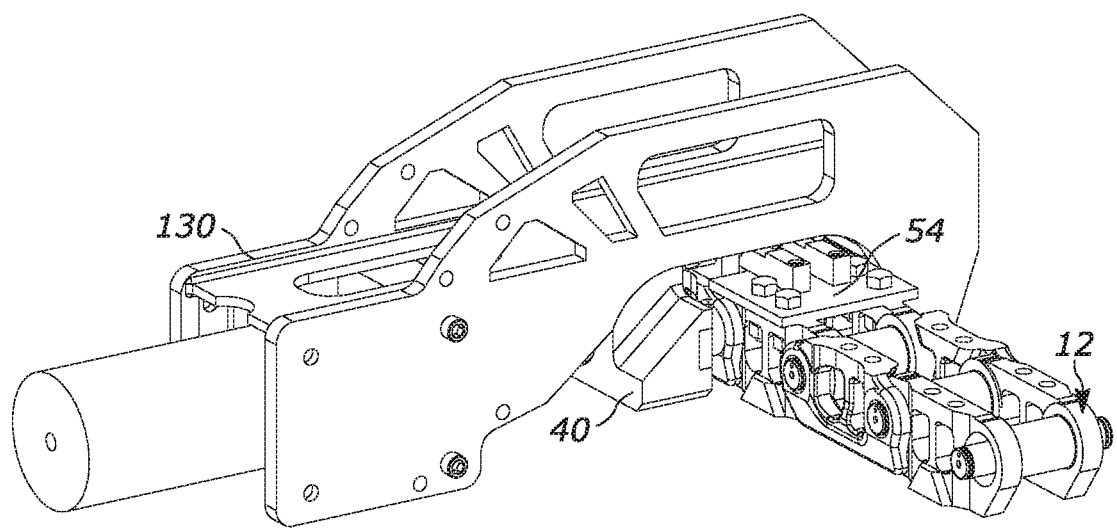
FIG. 32 is a perspective view of the field press, alignment tools, and reassembly tools of FIG. 31, with the piston rod actuated during reassembly.

Referring to FIG. 31, the field press 130 is then positioned perpendicular to the parallel link track chain 12 and onto the bridge plate 54 with the backing cups 116 abutted to the pins 24 at the inboard outer link 18 and the piston rod 140 aligned with the piston rod cavity 42 of the contact block 40, and the support walls 138 resting in the guide notches 61 in each of the rod guides 60. Referring to FIG. 32, the piston rod 140 is then actuated to drive the contact block 40 towards the backing plate 134, pushing the pin passages 29 of the outboard outer link 14 onto the pins 24 until the pin ends 152 abut the front cups 122. The piston rod 140 is then retracted and the field press 130, reassembly tools 34, and alignment tools 30 are removed from the parallel link track chain 12.

The use of the aforementioned tools available in the link press assembly 10 allows for link and pin alignment to be maintained during disassembly and reassembly of the parallel link track chain 12. Such alignment is important for proper repair of parallel link track chain configurations. Although the alignment tools 30, disassembly tools 32, and reassembly tools 34 have been shown and described with various different components, it shall be understood that in some embodiments, some of the associated components can be formed integrally with each other, while other components can be separated to form multiple components while maintaining similar overall functionality.

Various aspects of the link press assembly 10 can be modified within the spirit of the invention. In addition to the disclosed shapes and sizes, all the aforementioned components, can vary to include numerous adaptations. Further, the material composition of all components can also include numerous materials, such as steel, aluminum, alloys, plastics, etc. Although various components are shown and/or described in pairs, it is to be understood that a plurality of such components can be utilized to perform the same or similar function as disclosed herein, and the use of the term "plurality" in the description or claims shall be understood to include "one or more."

While the invention is particularly useful for servicing parallel link track chains, other applications are possible and references to use with parallel link track chains should not be deemed to limit the application of the invention. Rather, the invention may be advantageously adapted for use where similar performance capabilities and characteristics are desired, and that such modifications may be made by one of skill in the art of the invention without departing from the spirit or intent of the invention and therefore, the invention is to be taken as including all reasonable equivalents to the subject matter.

What is claimed is:

1. A link press assembly for use with a press to service a parallel link track chain comprising:
   alignment tools comprising:
      a contact block having:
         block guide rod passages extending therethrough;
         an elongated piston rod cavity on a first side; and
         a bar channel on an opposite second side;
      a plurality of block guide rods slidingly receivable within the block guide rod passages;
      a generally planar bridge plate for securement to a parallel link track chain, the bridge plate having a top surface, a bottom surface, and a plurality of apertures extending therethrough;
      a plurality of elongated rod guides secured to the top surface of the bridge plate, the rod guides including plate guide rod passages for slidingly receiving therein the block guide rods; and
      a support block secured to the bridge plate and having a plurality of support pegs extending therefrom for engagement with the track chain;
   disassembly tools comprising:
      a disassembly mount plate;
      an inner link support plate;
      a plurality of disassembly rods;
      an outer link support plate couplable to the inner link support plate and the disassembly rods via a plurality of fasteners; and
      a disassembly tool bar having a plurality of pin bumpers secured thereto, wherein the disassembly tool bar is securable to the bar channel; and
   reassembly tools comprising:
      a back tool plate having a back side and a front side;
      a plurality of backing cups secured to the front side of the back tool plate;
      a reassembly front tool bar having a first side with a plurality of front cups secured thereto, wherein the reassembly front tool bar is securable to the bar channel; and
      a link hanger having a plurality of hanger guide rod passages for slidingly receiving the block guide rods.

2. The link press assembly of claim 1, wherein the rod guides include guide notches.

3. The link press assembly of claim 2, wherein the block guide rods include pin holes for receiving rod pins therein.

4. The link press assembly of claim 3, wherein the back tool plate includes a plate press engagement portion for engaging an aperture in a backing plate of a press.

5. The link press assembly of claim 3, wherein the track chain includes:
   an outboard outer link and an inboard outer link interconnected by a pair of pins; and
   outboard inner links and inboard inner links coupled with the pins on opposite sides of the outboard outer link and inboard outer link, wherein the outboard outer link, inboard outer link, outboard inner link, and inboard inner link include shoe bolt holes and shoe slots.

6. The link press assembly of claim 5, wherein:
   the inner link support plate and the outer link support plate are positioned on opposing sides of the outboard outer link;
   the disassembly mount plate is positioned at the inboard outer link; and
   the disassembly rods secured to the disassembly mount plate and pass through the shoe slots of the inboard outer link to be secured to the inner link support plate.

7. The link press assembly of claim 6, wherein the bridge plate is secured to the shoe bolt holes of the outboard inner links and inboard inner links via a plurality of fasteners.

8. The link press assembly of claim 7, wherein the support pegs of the support block are positioned inside the shoe bolt holes of the outboard outer link.

9. A method of disassembling a parallel link track chain, the track chain including an outboard outer link and an inboard outer link interconnected by a pair of pins having first ends, and outboard inner links and inboard inner links coupled with the pins on opposite sides of the outboard outer link and inboard outer link, and each of the outboard outer link, inboard outer link, outboard inner link, and inboard inner link including shoe bolt holes, the method comprising:
   providing a disassembly mount plate having a plurality of disassembly rods extending therefrom and inserting the disassembly rods through a plurality of shoe slots in both the outboard outer link and inboard outer link, to position the disassembly mount plate on an inboard side of the inboard outer link;

positioning an inner link support plate between the outboard outer link and inboard outer link, and in abutment with the outboard outer link;

positioning an outer link support plate against an outboard side of the outboard outer link opposite the inner link support;

securing the inner link support plate and outer link support plate to the outboard outer link, and to the disassembly rods using a plurality of fasteners;

securing a bridge plate to a top portion of the track chain via a plurality of fasteners and shoe nuts extending into the shoe bolt holes of the outboard inner links and inboard inner links positioned adjacent to the outboard outer link and inboard outer link, wherein a plurality of support pegs extending from the bridge plate are situated in the shoe bolt holes of the outboard outer link;

sliding a plurality of block guide rods through a plurality of plate guide rod passages in a plurality of rod guides secured to the bridge plate, and at least partially securing the block guide rods relative to the rod guides;

providing a contact block having block guide rod passages, a piston rod cavity on a first side, and a plurality of pin bumpers secured to a second side;

sliding the block guide rod passages over the block guide rods until abutment of the pin bumpers with the first ends of the pins;

positioning a press over the bridge plate with a backing plate of the press in contact with the disassembly mount plate and a press piston rod in the piston rod cavity; and actuating the piston rod towards the backing plate to push the pins out of respective pin passages in the outboard outer link.

10. A method of reassembling a parallel link track chain, the track chain including an outboard outer link and an inboard outer link interconnected by a pair of pins having first ends, and outboard inner links and inboard inner links coupled with the pins on opposite sides of the outboard outer link and inboard outer link, and each of the outboard outer link, inboard outer link, outboard inner link, and inboard inner link including shoe bolt holes, the method comprising:

securing a bridge plate to a top portion of the track chain via a plurality of fasteners and shoe nuts extending into the shoe bolt holes of the outboard inner links and inboard inner links positioned adjacent to the outboard outer link and inboard outer link;

sliding a plurality of block guide rods through a plurality of plate guide rod passages in a plurality of rod guides secured to the bridge plate, and at least partially securing the block guide rods relative to the rod guides;

securing a link hanger having a plurality of hanger guide rod passages to the outboard outer link and sliding the hanger guide rod passages onto the block guide rods;

providing a contact block having block guide rod passages, a piston rod cavity on a first side, and a plurality of front cups secured to a second side;

sliding the block guide rod passages over the block guide rods until abutment of the front cups with the outboard outer link;

positioning a back tool plate at an inboard side of the inboard outer link;

positioning a press over the bridge plate with a backing plate of the press in contact with the back tool plate and a press piston rod in the piston rod cavity; and actuating the piston rod to push the outboard outer link towards the backing plate until the pins are secured in respective pin passages in the outboard outer link.

\* \* \* \* \*